United States Patent [19]
Ouchi

[11] Patent Number: 5,602,335
[45] Date of Patent: Feb. 11, 1997

[54] ROLLING BEARING UNIT FITTED WITH ROTATIONAL SPEED SENSOR

[75] Inventor: Hideo Ouchi, Fujisawa, Japan

[73] Assignee: NSK Ltd., Tokyo, Japan

[21] Appl. No.: 543,713

[22] Filed: Oct. 16, 1995

[30]  Foreign Application Priority Data

Oct. 17, 1994 [JP] Japan .................. 6-250898

[51] Int. Cl.⁶ .................................. G01P 1/02
[52] U.S. Cl. .............................. 73/494; 324/174
[58] Field of Search ............ 73/493, 494, 514.39; 324/174; 384/448

[56]  References Cited

U.S. PATENT DOCUMENTS

| | | | |
|---|---|---|---|
| 4,907,445 | 3/1990 | Okumura | 73/118.1 |
| 4,954,775 | 9/1990 | Richmond | 73/518 |
| 5,140,261 | 8/1992 | Seo et al. | 324/174 |
| 5,332,964 | 7/1994 | Ouchi | 324/174 |
| 5,393,146 | 2/1995 | Ishikawa et al. | 384/448 |

FOREIGN PATENT DOCUMENTS

| | | |
|---|---|---|
| 0557931 | 9/1993 | European Pat. Off. . |
| 5-14634 | 2/1993 | Japan . |
| 6-64508 | 3/1994 | Japan . |

*Primary Examiner*—Richard Chilcot
*Assistant Examiner*—Max H. Noori
*Attorney, Agent, or Firm*—Evenson, McKeown, Edwards & Lenahan, P.L.L.C.

[57]  ABSTRACT

A rolling bearing unit with a rotational speed sensor has a sensor which is clamped on opposite axial sides between the end plate of the cover and an axial end face of the open end portion of the outer ring member with the engaging portion externally secured to the open end portion of the outer ring member.

6 Claims, 7 Drawing Sheets

ROLLING BEARING UNIT FITTED WITH ROTATIONAL SPEED SENSOR

BACKGROUND OF THE INVENTION

1. Field of the Invention

The present invention relates to a rolling bearing unit fitted with a rotational speed sensor (referred to hereunder as a speed sensing rolling bearing unit), used for rotatably supporting a vehicle wheel on a suspension unit, and detecting the rotational speed of the wheel.

2. Description of the Related Art

Referring to FIG. 8, there is shown an example of a speed sensing rolling bearing unit as disclosed in U.S. Pat. No. 4,907,445, for rotatably supporting a vehicle wheel on a suspension unit, and detecting the rotational speed of the wheel in order to control of an anti-lock braking system (ABS) or a traction control system (TCS).

The speed sensing rolling bearing unit shown in FIG. 8, has a hub 3 having a flange 1 for wheel fixture provided on an axially outer end portion (the term "axially outer" means the widthwise outer side when fitted to a vehicle; the left side in FIG. 8) and a first inner ring raceway 2a formed on a central outer peripheral face thereof, and an inner ring 4 having a second inner ring raceway 2b formed on an outer peripheral face thereof, and externally fitted to the outer peripheral face of the central portion of the hub 3. The inner ring 4 constitutes an inner ring assembly together with the hub 3.

Formed on an outer peripheral face of the axially inner end portion of the hub 3 (the term "axially outer" means the widthwise outer side when fitted to a vehicle; the left side in FIG. 8) is a threaded portion 5, onto which a nut 6 is threaded to thus press against the axially inner end face of the inner ring member 4, and thereby secure the inner ring member 4 at a predetermined location on the outer peripheral face of the hub 3. The speed sensing rolling bearing unit has also an outer ring member which has an attachment portion 7 on an outer peripheral face thereof for attachment to a suspension unit (not shown) and a double row outer ring raceway 8a, 8b formed on an inner peripheral face thereof.

A plurality of rolling elements 10 are provided between the outer ring raceway 8a, 8b and the first and second inner ring raceways 2a, 2b, respectively, so that the hub 3 for wheel fixture is rotatably supported inside the outer ring member 9 which is in turn supported on the suspension unit.

The speed sensing rolling bearing unit further has a cylindrical tone wheel 11 which is externally secured to an axially inner half portion of the inner ring 4. Recesses/protrusions 12 are formed on the axially inner end face of the tone wheel 11, so that the magnetic characteristics of the axially inner end face are changed alternately in the circumferential direction and at an even spacing.

The outer ring member 9 is formed with an opening at its axially inner end, and the cover 13 is mounted in an opening portion at the inner end of the outer ring member 9 to cover the opening. The speed sensing rolling bearing unit further has a sensor 14 which is fixed to the cover 13, such that an axially outer end face of the sensor 14 is opposed to the recesses/protrusions 12 of the tone wheel 11.

At the time of operation of the speed sensing rolling bearing unit as described above, a vehicle wheel fixed to the flange 1 on the axially outer end of the hub 3 is rotatably supported relative to the suspension unit to which the outer ring member 9 is attached. When the tone wheel 11, externally secured to the inner ring member 4, rotates with rotation of the vehicle wheel, the output of the sensor 14 faced to the recesses/protrusions 12 on the inner end face of the tone wheel 11 changes. Since the frequency with which the output of the sensor 14 changes is proportional to the rotational speed of the wheel, then if the output signal from the sensor 14 is input to a controller (not shown), the rotational speed of the vehicle wheel can be obtained, so that an anti-lock braking system (ABS) or a traction control system (TCS) can be appropriately controlled.

With the conventional speed sensing rolling bearing unit constructed and operated as described above, miniaturization is difficult, so that vehicles to which it can be fitted are limited to relatively large vehicles. More specifically, in order to detect the rotational speed of the vehicle wheel, the sensor 14 must be arranged so as to be axially faced to the recesses/protrusions 12 formed on the axially inner end face of the tone wheel 11. Therefore a large axial dimension for the rotational speed detection part cannot be avoided.

In particular, in the case of comparatively low cost units, a simple magnetic material member (not permanent magnet material) is used for the tone wheel 11, and a so-called passive type device with a coil wrapped around a core member of magnetic material is used for the sensor 14 faced to the tone wheel 11. With such a passive type sensor 14, in order to maintain enough the output of sensor 14, the axial dimension of the sensor 14 is increased to some extent. Accordingly, there are problems depending on the extent that the axial dimensions of the rotational speed detection unit are increased.

As well as the abovementioned speed sensing rolling bearing units, there are also those disclosed in Japanese Patent First Publication KOKAI No. H1-175502, and Japanese Utility Model First Publication KOKAI No. H3-99676. With the configurations disclosed in these respective publications, the magnetic characteristics of the inner and outer peripheral faces of the tone wheel are changed around the peripheral direction, and the detection portion of the sensor is arranged to be faced to the inner and outer peripheral faces. With such configurations, since the core member of the passive type sensor is positioned in the axial direction, sufficient miniaturization is not always possible.

European Patent Publication No. 0426298A1 discloses a configuration wherein the limited space is effectively utilized and the sensor output increased, by forming the sensor in an annular shape so that an inner peripheral face of the sensor is radially opposed to an outer peripheral face of the tone wheel around the whole circumference. With the speed sensing rolling bearing unit according to this European Patent Publication, as shown in FIG. 9, gear tooth-like projections are formed around the outer peripheral face of a tone wheel 11a which is fixed to an axially inner end of a hub 3. Moreover an annular sensor 14a is retained inside an inner peripheral face of a cover 13 which is secured to an inner end opening portion of an outer ring member 9, so that an inner peripheral face of the sensor 14a is radially opposed to an outer peripheral face of the tone wheel 11a across a small gap, around the whole circumference.

By forming the sensor 14a in an annular shape so that the inner peripheral face of the sensor 14a is opposed to the outer peripheral face of the tone wheel 11 around the whole circumference, then the amount of change in the magnetic flux flowing in the sensor 14a can be increased, and the output of the sensor 14a thus increased. As well enabling an increase in the output of the sensor 14a, the annular shape of the sensor 14a enables the limited space to be effectively utilized, so that the speed sensing rolling bearing unit is not increased in size.

With the speed sensing rolling bearing unit of the above-mentioned European patent publication, the following points still require improvement. That is to say, due to vibrations accompanying vehicle travel, the sensor 14a is subjected to forces in a direction to displace the sensor 14a from the cover 13. Moreover when such forces act on a joint between the sensor 14a and the cover 13, this joint is damaged. For example, the sensor 14a comprising a permanent magnet, a pole piece and a coil formed in annular shape, and embedded in a synthetic resin, is fitted into the cover 13. This is a primary synthetic resin molding. A connector into which is inserted a plug on the end of a signal output harness, is then molded from synthetic resin, and this is a secondary synthetic resin molding. And the primary synthetic resin molding for the main body 25 welded to the secondary synthetic resin molding for the connector via an aperture formed in the cover 13. Therefore, if the sensor 14a vibrates, a stress acts on this welded joint.

If this stress is small there is no real problem, however the stress can becomes large proportional to the mass of the sensor 14a. Moreover, while the annular sensor 14a can be located in a limited space, the overall weight is increased. As a result, with a speed sensing rolling bearing unit fitted with the annular sensor 14a, the welded joint of the abovementioned main body portion and connector portion is susceptible to damage.

SUMMARY OF THE INVENTION

The speed sensing rolling bearing unit according to the present invention has been developed with the object of avoiding damage to the welded joint, arising due to the above causes.

An object of this invention is to provide a speed sensing rolling bearing unit which has a sensor clamped on opposite axial sides between the end plate of the cover and an axial end face of the open end portion of the outer ring member with the engaging portion of the cover externally secured to the open end portion of the outer ring member.

DETAILED DESCRIPTION OF THE PREFERRED EMBODIMENTS

Figure 1:
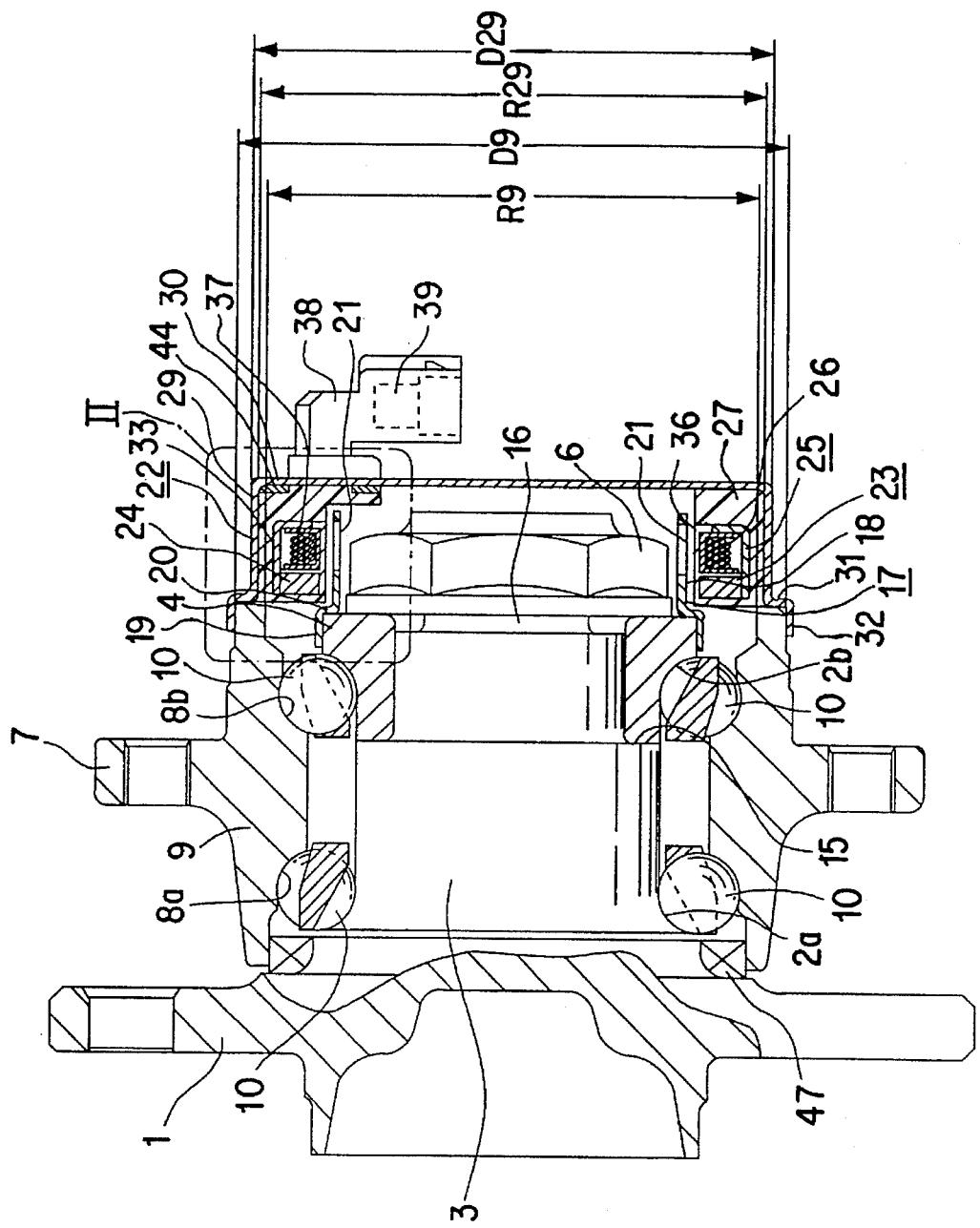
FIG. 1 is a cross-sectional view of a first embodiment of the speed sensing rolling bearing unit according to the present invention.

As with the beforementioned conventional speed sensing rolling bearing unit, the speed sensing rolling bearing unit according to the present invention incorporates; a stationary outer ring member having an outer ring raceway on an inner peripheral face thereof, a rotatable inner ring assembly having an inner ring raceway on an outer peripheral face thereof, a plurality of rolling elements provided between the outer ring raceway and the inner ring raceway, a cover fixed to an open end portion of the outer ring member, an annular sensor supported inside the cover around the whole periphery thereof, and a rotatable tone wheel made from a magnetic material and supported on the inner ring assembly.

In particular, with the speed sensing rolling bearing unit of the present invention, the cover comprises a cylindrical portion for retaining the sensor in it, having an inner diameter which is larger than the inner diameter and smaller than the outer diameter, of the open end portion of the outer ring member, an end plate bent radially inward from one of the axial ends of the cylindrical portion, a step portion bent radially outward from the other of the axial ends of the cylindrical portion, and an engaging portion bent from an outer peripheral rim of the step portion, axially away from the cylindrical portion and externally secured to the open end portion of the outer ring member. Moreover, when the engaging portion is externally secured to the open end portion of the outer ring member, the sensor is clamped on opposite axial sides between the end plate of the cover and an axial end face of the open end portion of the outer ring member.

With the speed sensing rolling bearing unit according to the present invention constructed as described above, the sensor can be located in a limited space, and the sensor output made sufficiently large so that rotational speed detection of a member such as a vehicle wheel, which rotates together with the inner ring, can be accurately carried out. At the same time the sensor is supported with no possibility of displacement, so that damage to the sensor can be reliably prevented. That is to say, since the sensor is clamped on its opposite axial sides between the end plate of the cover and the axial end face of the outer ring member, then the heavier sensor will not be displaced axially even due to vibrations accompanying vehicle travel. Therefore the undue force due to axial displacement of the sensor, is not applied to parts of the sensor, so that damage to the sensor is prevented.

FIGS. 1 through 6 show an embodiment of the present invention. A hub 3 has an outer peripheral face at its axially outer end which is formed with a flange 1 for wheel fixture, and a central outer peripheral surface which is formed with a first inner ring raceway 2a and a step portion 15. An inner ring 4 formed with a second inner ring raceway 2b on an outer peripheral face thereof, is externally fitted to an outer peripheral face at the axially inner end of the hub 3, with an axially outer end face thereof (left end face in FIG. 1) abutted against the step portion 15.

There is also the case where, instead of directly forming the first inner ring raceway 2a on the outer peripheral surface of the hub 3, it is formed on an inner ring (not shown) separate from the hub 3, which is externally fitted to the hub 3 together with the inner ring 4.

A threaded portion 16 is formed on a portion of the hub 3 near the axially inner end thereof for receiving a nut 6.

The inner ring assembly is thus formed by fixing the inner ring 4 at a predetermined location on the outer peripheral face of the hub 3 by means of the nut 6 which is threaded onto the threaded portion 16 and tightened.

An outer ring member 9, which is located around the hub 3, is provided with an attachment portion 7 on a central outer peripheral face thereof, for securing the outer ring member 9 to a suspension unit. An inner peripheral face of the outer ring member 9 is formed with outer ring raceways 8a, 8b opposite to the first and second inner ring raceways 2a, 2b, respectively. A plurality of rolling elements 10 are respectively provided between the first and second inner ring raceways 2a, 2b and the outer ring raceways 8a, 8b so that the hub 3 is free to rotate inside the outer ring member 9.

With the example shown in the figures, balls are used for the rolling elements 10. However in the case of a hub unit for heavy vehicles, tapered rollers may be used.

A seal ring 47 is fitted between the inner peripheral face at the axially outer end of the outer ring member 9, and the outer peripheral face of the hub 3, to cover the axially outer end opening of the space in which the plurality of rolling elements 10 are provided, between the inner peripheral face of the outer ring member 9 and the outer peripheral face of the hub 3.

A tone wheel 17 is provided around and spaced apart from the nut 6. A base end (left end in FIGS. 1 to 6) of the tone wheel 17 is externally fixed to a portion on an axially inner end (right end in FIG. 1) of the inner ring 4, which is spaced away from the second inner ring raceway 2b.

The tone wheel 17 is formed in an overall cylindrical shape from a magnetic metal plate such as a steel plate, with a smaller diameter portion 18 and larger diameter portion 19 formed concentric with each other and connected by a step portion 20. The tone wheel 17 is fixedly supported on the inner ring 4, with the larger diameter portion 19 externally fitted to the outer peripheral face at the axially inner end of the inner ring 4, with the step portion 20 abutted against the inner end rim of the inner ring 4. Consequently, the smaller diameter portion 18 is supported concentric with the inner ring 4.

A plurality of through-apertures 21 are formed in the small diameter portion 18, at even spacing around the circumference. The apertures 21 are formed in the same rectangular shape, for example, with the long side aligned with the axial direction (left/right direction in FIGS. 1 to 6). Cut-outs (not shown) can be formed instead of the apertures 21. When the cut-outs are formed instead of apertures 21, then the tip half of the smaller diameter portion 18 is formed in a comb-like shape. The apertures or cutouts form a first cutout section.

An inner end opening of the outer ring member 9 is covered with a cover 22 made in the form of a bottomed cylinder, for example, by deep-drawing a metal plate such as an aluminum alloy plate or stainless steel plate. The cover 22 has cylindrical portion 29. An inner diameter R29 of the cylindrical portion 29 is larger than the inner diameter R9 of the open end portion of the outer ring member 9, and smaller than the outer diameter D9 of the open end portion of the outer ring member 9(D9>R29>R9).

A synthetic resin molding 27 with an annular sensor 23 (to be described later) embedded therein, is fixedly retained within an inner peripheral side of the cylindrical portion 29. An axially inner end of the cylindrical portion 29 is provided with an end plate 30 bent radially inward from this axially inner end, while an axially outer end of the cylindrical portion 29 is formed with a step portion 31 bent radially outward from this axially outer end. An outer peripheral rim of the step portion 31 is formed with an engaging portion 32 bent from this outer peripheral rim, in an axially outward direction (axially away from the cylindrical portion 29). The engaging portion 32 is externally secured to the axially inner end portion of the outer ring member 9, with the step portion 31 abutted against the axially inner end face of the outer ring member 9.

The outer diameter D29 of the cylindrical portion 29 is made about 0 mm to about 0.5 mm smaller than the inner diameter of a tool used at the time of fitting the cover 22 to the outer ring member 9, so that the cover 22 can be supported inside the tool with a small clearance. This is to ensure that the operation of fitting the cover 22 can be carried out without tilting the cover 22.

Since the cover 22 of the above construction is not used as a flow path for magnetic flux from a permanent magnet 24 of a sensor 23 (to be described hereunder), it is preferably made from a non-magnetic material such as synthetic resin, aluminum alloy or copper. Accordingly it may also be made from stainless steel plate, the use of a non-magnetic stainless steel being preferable from the point of view of preventing leakage of the magnetic flux. The synthetic resin molding 27 in which is embedded the overall annular shaped sensor 23, is secured inside this cover 22.

The sensor 23 comprises; the permanent magnet 24, a pole piece 25 made from a magnetic material such as steel plate, and a coil 26, respectively formed in an overall annular shape for embedding in the synthetic resin molding 27. The synthetic resin molding 27 is injection molded with the sensor 23 set in the mold, which is referred to as primary molding. The resultant molding is internally fitted inside the cylindrical portion 29 of the cover 22.

In order to simplify the internal fitting operation, a plurality of ribs are formed in an axial direction (left right direction in FIGS. 1 to 6) on the outer peripheral face of the synthetic resin molding 27. These ribs are easily deformed under pressure with the internal fitting operation. The axially outer end face (left face in FIGS. 1 to 6) of the synthetic resin molding 27 formed in this way and secured inside the cover 22, is flush with the axially outer face (left face in FIGS. 1 to 6) of the step portion 31.

Consequently, with the axially outer face of the step portion 31 abutted against the axially inner end face of the outer ring member 9, the axially outer end face of the synthetic resin molding 27 also abuts against the axially inner end face of the outer ring member 9.

The permanent magnet 24 of the sensor 23 is formed in an overall annular shape and magnetized in the radial direction. That is to say with the example shown in the figures, the inner peripheral face of the permanent magnet 24 is made a south pole, while the outer peripheral face is made a north pole. However, there is no objection to the magnetized direction being in the opposite direction.

The inner peripheral face (S pole) of the permanent magnet 24 is opposed, across a small gap 28, to an outer peripheral face of an axially outer end portion of the smaller diameter portion 18 of the tone wheel 17, in which the apertures 21 are not formed.

For the permanent magnet 24, the use of a rare earth type magnet with a high flux density per unit area has been considered. However, with the configuration of the present embodiment, the flux density per unit are need not be high since the output of sensor 23 can be made sufficiently large. Accordingly, a low cost one such as a standard ferrite magnet, or plastic magnet with a ferrite mixed in synthetic resin, may be used for the permanent magnet, enabling a reduction in manufacturing costs. For the plastic magnet material, a hexanylon is used generally.

The pole piece 25 is formed in an overall annular shape of approximate J-shape in cross section. Specifically, the pole piece 25 comprises an outer cylindrical portion 33, a ring portion 34 bent radially inwards from the axially inner end (right end in FIGS. 1 to 3) of the outer cylindrical portion 33, and an inner cylindrical portion 35 bent from the inner peripheral rim of the ring portion 34 to extend in the same direction as the outer cylindrical portion 33.

An inner peripheral face on the axially outer end (left end in FIGS. 1 to 3) of the outer cylindrical portion 33 is located near to or in abutment with an outer peripheral face of the permanent magnet 24. An inner peripheral face of the inner cylindrical portion 35 is faced to the first cutout section of the tone wheel 17 in which the apertures 21 are formed.

Furthermore a plurality of cut-outs 36 are formed to extend from the inner peripheral rims of the inner cylindrical portion 35 to the ring portion 34 and arranged around the circumference thereof, with a pitch equal to that of the apertures 21 (central angle pitch). Accordingly the portion from the inner cylindrical portion 35 to the inner peripheral rim of the inner ring portion 34, is formed in a comb-teeth shape. The cut-outs 36 form a second outout section.

The coil 26 is formed as an annular shape with wire wound around a ring 37 of a non magnetic material, and is located in a region inside the inner peripheral face of the outer cylindrical portion 33 of pole piece 25 axially between the permanent magnet 24 and the ring portion 34 of the pole piece 25. An induced EMF produced in the coil 26 is taken out from a connector 38 which protrudes from the external face of the cover 22.

An aperture (not shown) is therefore formed in a portion of the pole piece 25 to take a lead for connecting the coil 26 to the connector 38. Moreover, an aperture 43 (FIG. 2) is formed in a part of the end plate 30 of the cover 22 at a portion where the connector 38 (FIG. 1) is fitted.

A plug on the end of a harness for taking out the signal, is inserted into the connector 38.

The connector 38 which is formed from a synthetic resin material, is made by forming the synthetic resin molding 27 through the primary molding in which is embedded the sensor 23, and then after internally fitting this primary molding into the cover 22, forming a synthetic resin molding 39 on the external face of the cover 22 through a secondary molding. The synthetic resin molding 39 forming the connector 38 and the synthetic resin molding 27 forming the main body with the sensor 23 embedded therein, are welded to each other via the aperture 43 (FIG. 2) formed in the end plate 30 of the cover 22.

Figure 2:
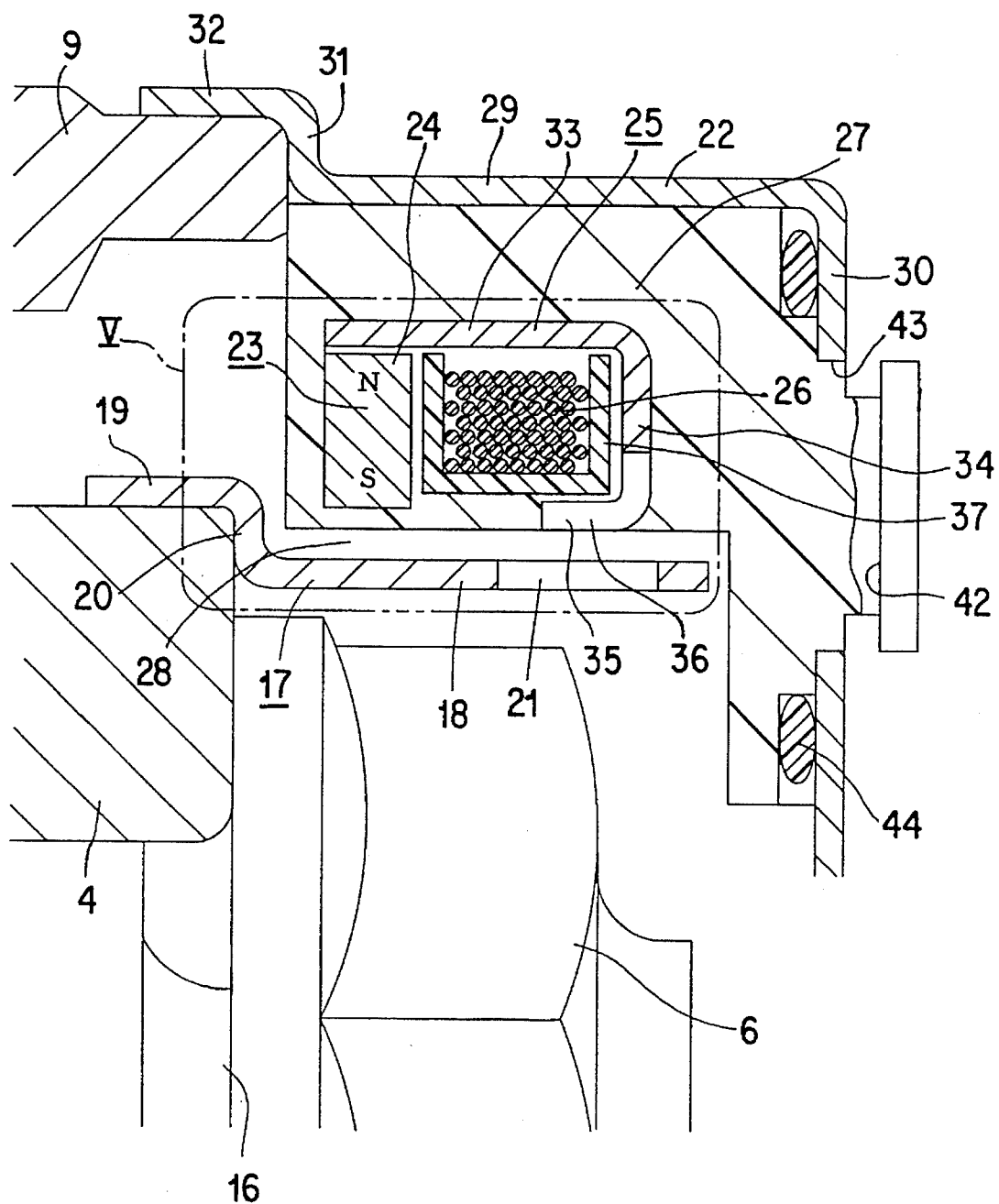
FIG. 2 is an enlarged view of part II of FIG. 1, showing a condition prior to forming a connector.

In order to improve the connecting strength of the weld, a channel 42 as shown in FIG. 2, is formed in a part of the synthetic resin molding 27. The synthetic resin molding 39 forming the connector 38 is molded through the secondary molding so as to enclose this channel 42.

Moreover, an O-ring 44 is provided in a portion surrounding the aperture 43, to prevent the ingress of rain water, and the like through the aperture 43 and into the cover 22. Fittings such as signal output terminals, arranged inside the connector 38 and protruding from the inner end face of the synthetic resin are omitted from the figures.

Figure 3:
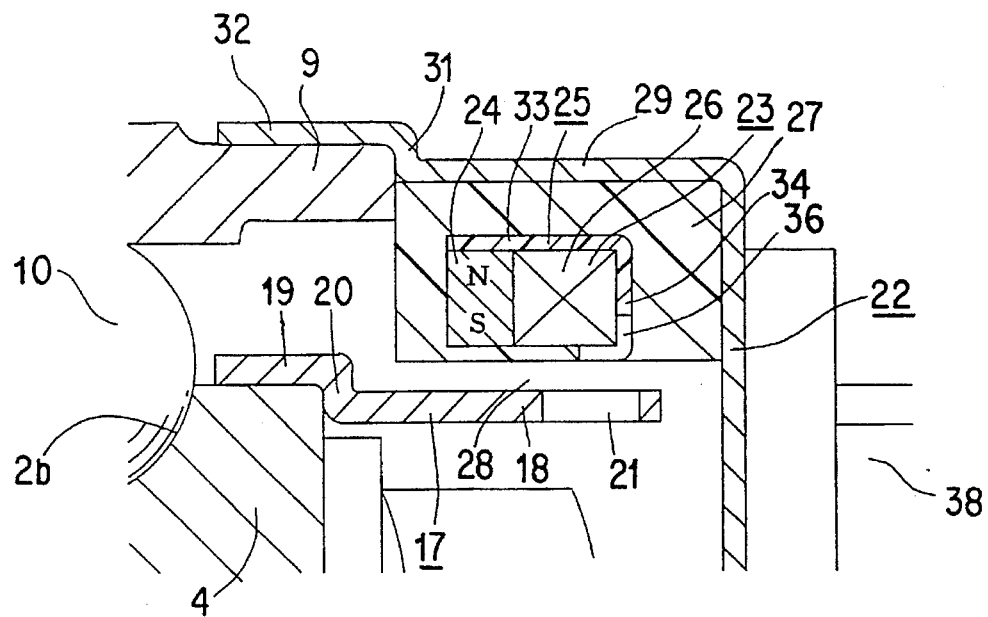
FIG. 3 is a cross-sectional view corresponding to the right top portion of the speed sensing rolling bearing unit of FIG. 1, for illustrating magnetic flux change in a pole piece.
Figure 4:
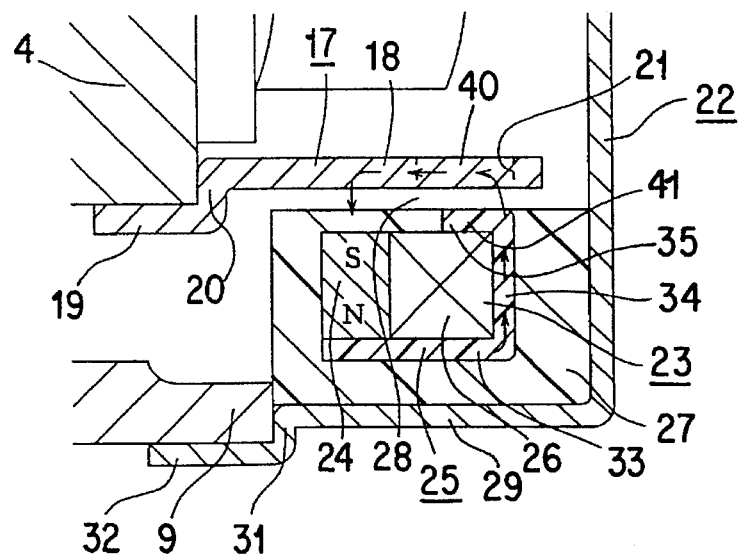
FIG. 4 is a cross-sectional view corresponding to the right lower portion of the speed sensing rolling bearing unit of FIG. 1.

During use of the speed sensing rolling bearing unit of the present invention constructed as described above, when the hub 3 and tone wheel 17 rotate, the flux density in the pole piece 25 faced to the tone wheel 17 changes, causing the voltage induced in the coil 26 to change with a frequency proportional to the rotational speed of the hub 3. The theory related to the change in voltage induced in the coil 26 with the change in density of the flux flowing in the pole piece 25, is similar to that for well known cases of rotational speed detection sensors, and description is thus omitted. The reason for the change in density of the flux flowing in the pole piece 25 with rotation of the tone wheel 17 is as follows:

Since the plurality of apertures 21 provided in the tone wheel 17, and the plurality of cut-outs 36 provided in the pole piece 25, have the same pitch, then with rotation of the tone wheel 17 they are simultaneously opposed to each other around the whole circumference. Moreover, in the condition wherein the apertures 21 and the cut-outs 36 are opposed to each other as shown in FIG. 3, the column portions 40 of magnetic material between adjacent pairs of apertures 21, and the tongue portions 41 of magnetic material between adjacent pairs of cut-outs 36 are also opposed to each other across the small gap 28 as shown in FIG. 4. With the respective column portions 40 and tongue portions 41 (magnetic bodies) opposed to each other in this way, a high density flux flows between the tone wheel 17 and the pole piece 25.

On the other hand, if the apertures 21 and the cut-outs 36 are out of phase by one half, the density of the flux flowing between the tone wheel 17 and the pole piece 25 drops. That is to say, in this condition, the apertures 21 provided in the tone wheel 17 are opposed to the tongue portions 41, and at the same time the cut-outs 36 provided in the pole piece 25 are opposed to the column portions 40. With the respective column portions 40 opposed to the cut-outs 36, and the tongue portions 41 opposed to the apertures 21 in this way, then a relatively large space exists between the tone wheel 17 and the pole piece 25 around the whole circumference. Therefore, in this condition, the density of the flux flowing between the tone wheel 17 and the pole piece 25 decreases. As a result of the above situation, the voltage induced in the coil 26 changes in proportion to the rotational speed of the hub 3.

In order to ensure an adequate change in flux density, the width of the apertures 21 is preferably made wider than that of the tongue portions 41, and the width of the cut-outs 36 is preferably made wider than that of the column portions 40. That is to say, the width of the apertures 21 and the cut-outs 36 is made wider than that of the column portions 40 and the tongue portions 41. For example, the circumferential dimension of the column portions 40 is made 35 to 45% of the pitch of the column portions 40. In this case, the width of the tongue portions 41 is made approximately the same as that of the column portions 40.

The sensor 23 functions in the above manner, with the output voltage induced in the coil 26 changing with a frequency proportional to the rotational speed of the hub 3. With this construction there is a natural annular space within the end opening portion of the outer ring member 9. There is thus the possibility of installing the sensor 23 into this limited natural space, while making the output of the sensor 23 sufficiently large, so that the rotational speed of a vehicle wheel rotating with the hub 3 can be accurately detected. That is to say, the permanent magnet 24, the pole piece 25 and the coil 26 which constitute the sensor 23 are formed in an annular shape so as to respectively surround the whole circumference of the tone wheel 17. Also, since the magnetic flux output from the permanent magnet 24 flows around the whole circumference of the pole piece 25, the amount of magnetic flux flowing inside the pole piece 25 can be sufficiently increased for the overall pole piece 25.

Accordingly, the voltage change in the coil 26 with the change in density of the flux passing through the pole piece 25 can be increased.

Moreover, with the embodiment shown in the figures, the inner peripheral face of the radially inner cylindrical portion 35 of the pole piece 25 is opposed to the outer peripheral face of the smaller diameter portion 18 of the tone wheel 17, with the column portions 40 of the tone wheel 17 and the tongue portions 41 of the pole piece 25 opposed over a wide area. Accordingly, with the column portions 40 and the tongue portions 41 in the opposed condition, magnetic saturation at the small gap 28 is unlikely to arise. Therefore a permanent magnet with a strong magnetic flux can be used for the permanent magnet 24, enabling the output of the sensor 23 higher.

Furthermore, with the embodiment shown in the figures, the path through the air space, the magnetic resistance of which is high, has a sufficiently large (wide) area to minimize the resistance of the air space path portion. The magnetic resistance for the overall magnetic path is therefore kept small, so that a large magnetic flux flows around the magnetic path, resulting in that the induced voltage (output voltage of the sensor 23) in the coil 26 is higher.

In particular with the speed sensing rolling bearing unit according to the present invention, the sensor 23 is supported with no possibility of backlash, so that damage to the sensor 23 can be reliably prevented. That is to say, the synthetic resin molding 27 in which the sensor 23 is embedded, is clamped on its opposite axial sides between the end plate 30 of the cover 22, and the axially inner end face of the outer ring member 9. Therefore, the synthetic resin molding 27 in which the sensor 23 is embedded with has an increased weight due to the annular shape, will not be displaced axially even due to vibrations accompanying vehicle travel. As a result, an undue force due to axial displacement of the synthetic resin molding 27 in which the sensor 23 is embedded, is not applied to the constituent parts of the sensor 23 such as the weld between the synthetic resin molding 27 and the synthetic resin molding 39 of the connector 38, so that damage to these parts is prevented.

With the embodiment shown in the figures, since the present invention is shown applied to a bearing unit for supporting a non driven wheel (front wheel of a front engine-rear wheel drive vehicle, or rear wheel of a front engine-front wheel drive vehicle), then the cover 22 for supporting the sensor 23 is formed with the axially inner end sealed. However, the present invention is not limited to bearing units used for non driven wheels, and is also applicable to bearing units for driven wheels (rear wheel of a front engine-rear wheel drive vehicle, or front wheel of a front engine-front wheel drive vehicle). When the present invention is applied to a bearing unit for the driven wheel, then the cover is formed in an annular shape, with an aperture provided in a central portion for insertion of part of a constant velocity joint. Moreover, the hub will be of a cylindrical shape with female splines formed in the inner peripheral face for engaging with male splines on the outer peripheral face of the drive shaft.

Also, with the embodiment shown in the figures, in order to simplify parts manufacture, improve ease of assembly and increase the output of the sensor 23, the following points (1) to (7) are given due consideration. These points (1) to (7) can also be embodied in speed sensing rolling bearing units having a different construction to that of the present invention.

(1) The width T28 of the small gap 28 between the inner peripheral face of the inner cylindrical portion 35 of the pole piece 25 of the sensor 23, and the outer peripheral face of the small diameter portion 18 of the tone wheel 17 (half the difference between the inner diameter of the inner cylindrical portion 35, and the outer diameter of the small diameter portion 18), is made equal to or greater than 0.8 mm.

This is aimed at improving the ease of assembly. By maintaining an adequate dimension for the width T28, then when inserting the small diameter portion 18 of the tone wheel 17 inside the annular sensor 23, damage due to bumping the sensor 23 with the small diameter portion 18 can be avoided. In the case of the heretofore commonly used non-annular sensor, in order to maintain enough the sensor output, the distance between the sensor and the tone wheel is made small at about 0.5 mm. Therefore, during the assembly operation, there is the likelihood of bumping the sensor against the tone wheel. In the case of a rotational speed detection unit using an annular sensor however, even though the width T28 of the small gap 28 is set comparatively large at above 0.8 mm, a sufficient output can still be maintained.

However, if the width T28 is made too large, then of course the output of the sensor 23 will be inadequate. Therefore, in order to maintain enough the necessary output, the upper limit for the width T28 should preferably be 1.0 mm so that sufficient output can be obtained even with a standard ferrite magnet, while the maximum should be no greater than 1.2 mm to obtain sufficient output using a rare earth magnet.

(2) The operation of forming the inner cylindrical portion 35 of the pole piece 25 is carried out after forming the cut-outs 36. This is aimed at facilitating manufacture of the pole piece 25. Compared to the case where the cut-outs 36 are formed after forming the inner cylindrical portion 35, the operation for manufacturing the pole piece 25 is simplified and manufacturing costs reduced. At the time of making the pole piece 25, the cut-outs 36 are first formed by taking a blank material formed in an overall annular shape of L-shape in cross-section, and subjecting this blank material to a punching operation. After this, the plurality of tongue portions 41 existing between the adjacent pairs of cut-outs 36 are subjected to a burring process, to thereby form the inner cylindrical portion 35 with the plurality of tongue portions 41 cylindrically arranged. By forming the pole piece 25 in this way, the operation of forming the cut-outs 36 can be carried out continuously in a transfer press, without the need for a separate press machine. Manufacturing costs for the pole piece 25, and for the sensor 23 having the pole piece 25 incorporated can thus be reduced.

Figure 5:
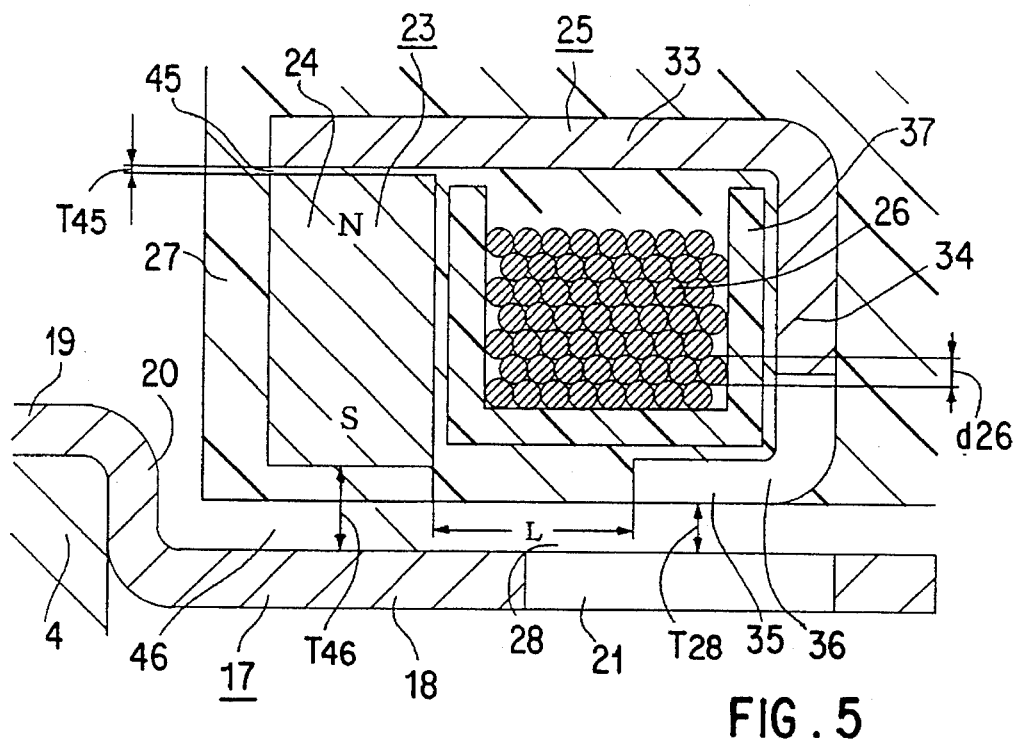
FIG. 5 is a enlarged view of part V of FIG. 2, for illustrating the dimensional relation of the sensor parts.

(3) When the permanent magnet 24 of the sensor 23 is a plastic magnet, then the outer diameter of the permanent magnet 24 is made the same as or a little smaller than the inner diameter of the pole piece 25. More specifically, as shown in FIG. 5, an interference gap 45 with a width T45 of about 0 mm to about 0.3 mm (half the difference between the inner diameter of the outer cylindrical portion 33, and the outer diameter of the permanent magnet 24) exists between the outer peripheral face of the permanent magnet 24 and the inner peripheral face of the outer cylindrical portion 33 of the pole piece 25.

This is to achieve a compromise between improvement in ease of assembly of the sensor 23, and maintenance of performance. Due to the small interference gap 45 of about 0 mm to about 0.3 mm, then at the time of fitting the permanent magnet 24 inside the outer cylindrical portion 33, damage to the permanent magnet 24 is avoided, while after installation, the magnetic flux can flow easily between the permanent magnet 24 and the outer cylindrical portion 33.

(4) The diameter (wire diameter) D26 of the wire of the coil 26 of the sensor 23 is made equal to or greater than 60 microns. This is to minimize the likelihood of wire breakage caused by heating with operation of the rotational speed detection unit, and heating due to braking. To maintain enough the output of the sensor 23 (maintain a high voltage), it is effective to have a large number of windings on the coil. When the non-annular type heretofore commonly used is incorporated in the unit, since the number of coil windings is large to maintain enough the sensor output, a wire of diameter D26 of up to 50 microns is used. With such a fine wire, there is the likelihood of wire breakage caused by heating with operation of the rotational speed detection unit, and heating due to braking.

On the other hand, in the case of the rotational speed detection unit using an annular sensor, even though a comparatively thick wire with a diameter D26 above 60 microns is used resulting in a reduction in the number of windings, sufficient output can still be maintained. However, if the diameter D26 is too large so that the number of windings of the coil is too small, then of course the output of sensor 23 will be inadequate. Therefore, in order to maintain the necessary output, the upper limit for the wire diameter D26 should preferably be 80 microns, and at the most 0.1 mm.

(5) The axial distance L as shown in FIG. 5, between the axially inner edge of the inner peripheral face of the permanent magnet 24, and the axially outer tip of the inner cylindrical portion 35 of the pole piece 25, is controlled by the relation between the width T28 of the small gap 28, and the width T46 of the small gap 46 between the inner peripheral face of the permanent magnet 24 and the outer peripheral face of the tone wheel 17.

More specifically, the axial distance L is set at 1.5 to 2 times the sum of the small gap widths T28 and T46 (L=from 1.5 ×(T28+T46) to 2×(T28+T46)). This is so as to maintain the output of the sensor 23. If the gap L is too small (L<1.5 ×(T28+T46)), then the flux flowing from the permanent magnet 24 to the pole piece 25, bypassing the tone wheel 17, is increased so that the amount of change in magnetic flux in the pole piece 25 with the rotation of the tone wheel 17 is reduced, resulting in a drop in the output of the sensor 23. On the other hand, if the tip of the inner cylindrical portion 35 is moved to the right in FIG. 5, to increase the distance L, then the axial length of the inner cylindrical portion 35 is shortened. As a result, the opposing area of the inner peripheral face of the inner cylindrical portion 35 and the outer peripheral face of the tone wheel 17 is reduced, so that the resistance to flow of the magnetic flux is increased. The amount of change in magnetic flux in the pole piece 25 with rotation of the tone wheel 17 is therefore reduced resulting in a drop in the output of sensor 23. If the ring 34 were moved towards the right in FIG. 5 so as to maintain the axial length of the inner cylindrical portion 35 sufficiently, the size of sensor 23 would be increased, and therefore this option cannot be adopted.

The axial distance L, for the range giving the maximum amount of change in the magnetic flux density, is therefore specified at L=from 1.5×(T28+T46) to 2×(T28+T46).

(6) The inner diameter of the permanent magnet 24 of the sensor 23 is made larger than the inner diameter of the synthetic resin molding 27 which encapsulates the sensor 23. This is to enable a smooth flow of the synthetic resin 27, so that sufficient synthetic resin can penetrate to the surroundings of the coil 26. With this arrangement, at the time of injection molding, the synthetic resin 27 can flow radially inwards of the permanent magnet 24 to reach the surroundings of the coil 26.

Instead of this arrangement, the inner diameter of the permanent magnet 24 may be made the same as that of the synthetic resin molding 27, provided that through-holes are axially extended in the permanent magnet 24 at a plurality of circumferential locations.

Figure 6:
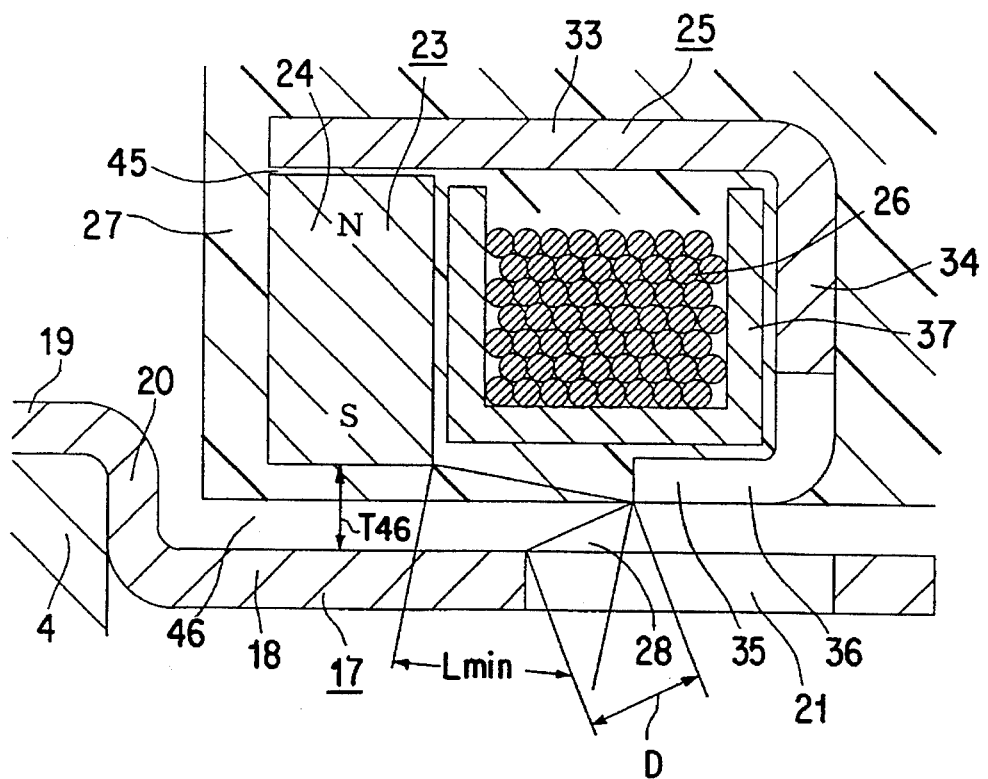
FIG. 6 is an enlarged view similar to FIG. 5.

(7) The shortest distance Lmin as shown in FIG. 6, between the axially inner edge of the inner peripheral face of the permanent magnet 24 of the sensor 23, and the axially outer tip of the inner cylindrical portion 35 of the pole piece 25, is controlled by the relationship with the width T46 of the small gap 46 between the inner peripheral face of the permanent magnet 24 and the outer peripheral face of the tone wheel 7, and with the distance D between the axially outer tip of the inner cylindrical portion 35 of the pole piece 25 and the axially outer edge of the aperture 21.

More specifically, the shortest distance Lmin is set to be more than the sum of the small gap width T46 and the distance D (Lmin>(T46+D)). This is so as to maintain the output of sensor 23. If the shortest distance Lmin is too small, that is to say the shortest distance Lmin becomes equal to or less than the total length through the air space portion when the magnetic flux flows via the tone wheel 17 (Lmin≦(T46+D)), then the magnetic flux flowing from the permanent magnet 24 directly to the pole piece 25, bypassing the tone wheel 17, is increased. The amount of change in magnetic flux in the pole piece 25 with the rotation of the tone wheel 17 is thus reduced, resulting in a drop in the output of sensor 23. The condition Lmin>(T46+D) is therefore specified to minimize the flow of magnetic flux directly to the pole piece 25 from the permanent magnet 24, so as to increase the amount of change in magnetic flux flowing in the pole piece 25 and thus maintain the output of sensor 23. Here the property of the magnetic flux which is inclined to flow along the path of least resistance is used, and the magnetic resistance along the path via the tone wheel 17 is made less than that along the path bypassing the tone wheel 17.

Figure 7:
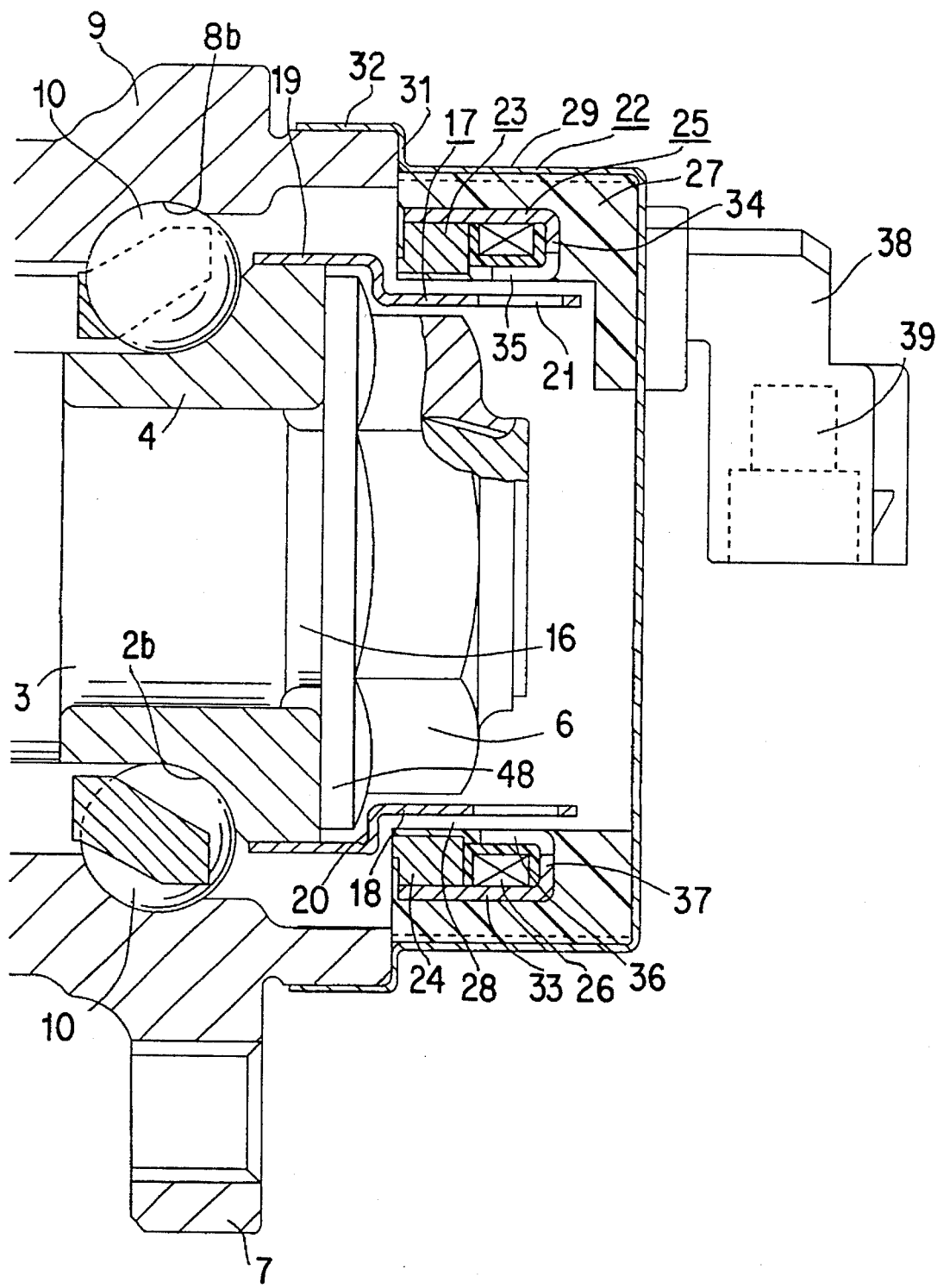
FIG. 7 is a cross-sectional view corresponding to the right portion of the speed sensing rolling bearing unit of FIG. 1, illustrating a second embodiment of the present invention.
Figure 8:
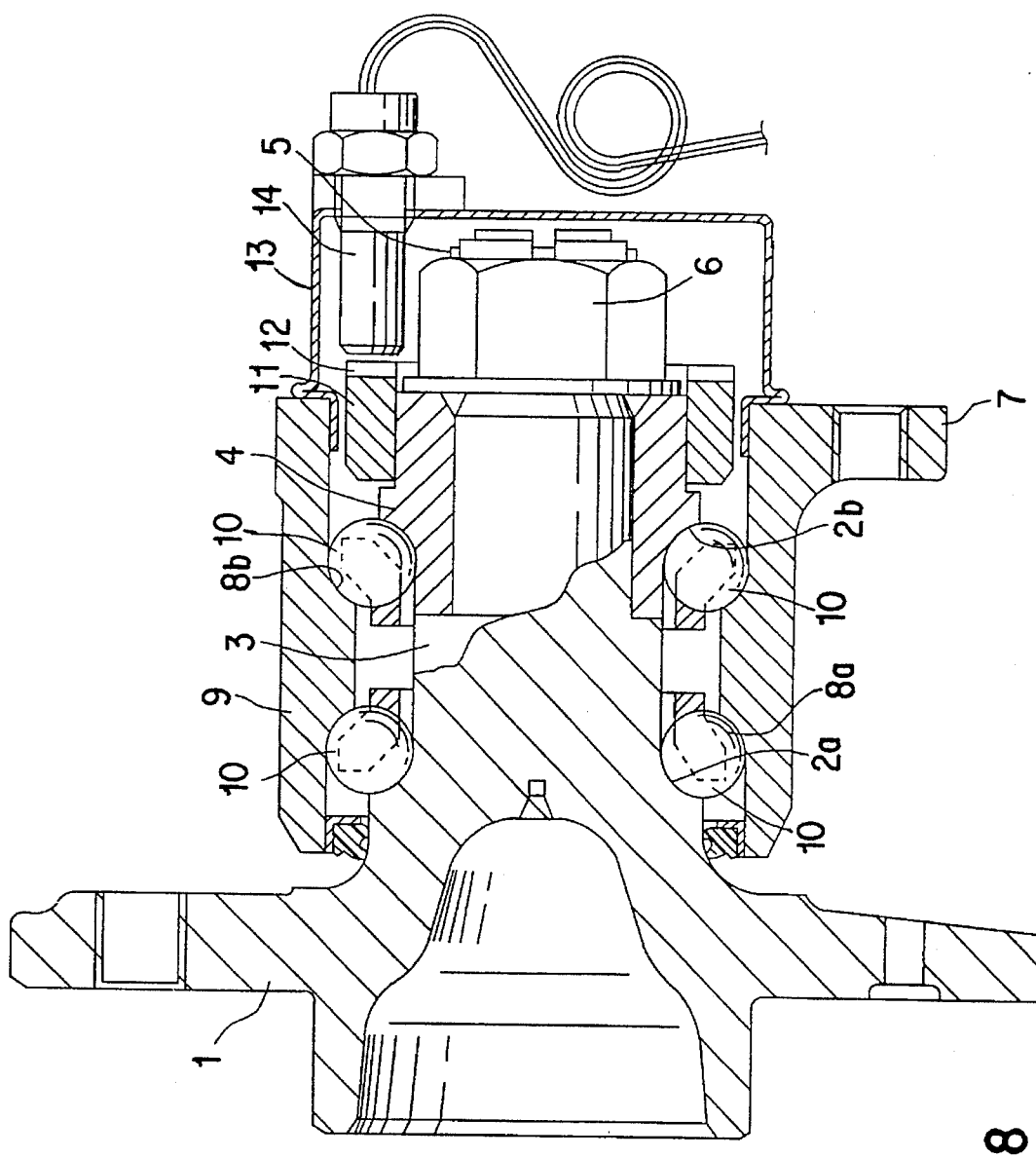
FIG. 8 is a cross-sectional view showing a first example of a conventional construction.
Figure 9:
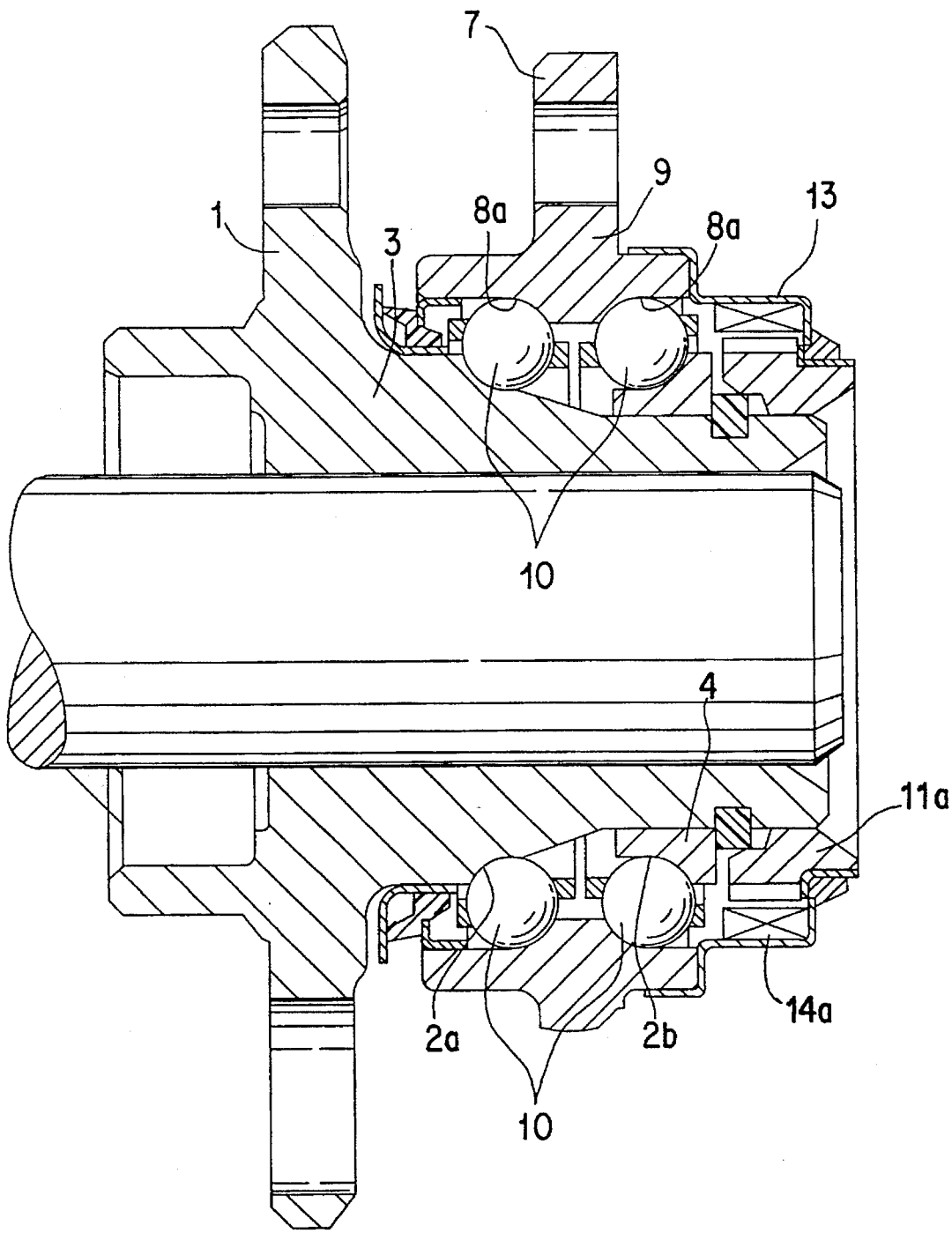
FIG. 9 is a cross-sectional view showing a second example of a conventional construction.

FIG. 7 shows a second embodiment according to the present invention. The second embodiment differs from those of the beforementioned first embodiment in the following points (1) to (4).

(1) The attachment portion 7 for attaching the outer ring member 9 to the suspension unit, is formed on the central portion of the outer peripheral face of the outer ring member 9 on a portion closer towards the axially inner end of the outer ring member 9. Accordingly, the axial length of the portion formed on the outer peripheral face of the axially inner end of the outer ring member 9, for externally securing the engaging portion 32 of the cover 22 is shorter. The engaging portion 32 can however, still be reliably fitted to the outer ring member 9, and the cover 22 thus reliably fitted and secured to the outer ring member 9.

(2) The width on the inner peripheral side of the permanent magnet 24 is made a little wider than the width on the outer peripheral side of the permanent magnet 24 (corresponding to the fact that the inner diameter is smaller than the outer diameter in the permanent magnet 24). In this way, the magnetized area on the inner peripheral side (width on the inner peripheral side x inner peripheral length) and the magnetized area on the outer peripheral side (width on the peripheral side x outer peripheral length) are made approximately the same. As a result, the magnetic flux flowing in the small gap 28 between the outer peripheral face of the tone wheel 17 and the inner peripheral face of the permanent magnet 24 is increased, resulting in an increase in the output of sensor 23. Moreover, since a part of the axially outer end face of the permanent magnet 24 is covered by the synthetic resin molding 27, the permanent magnet 24 is still prevented from moving axially outwards (to the left in FIG. 7) from the synthetic resin molding 27. With the example in FIG. 7, a step portion is formed in the axially outer end face of the permanent magnet 24. However the same effect can also be obtained by inclining the axially outer end face in the form of a conically protruding face.

(3) The radial thickness of the permanent magnet 24 ((outer diameter−inner diameter)/2) is controlled within the range from 3.5 mm to 8 mm. This is to prevent an increase in the size of sensor 23 while avoiding non-reversible demagnetization of the permanent magnet 24 to thus maintain the output of sensor 23 enough. That is to say, with the heretofore known small size permanent magnets, if the ambient temperature drops significantly from the normal temperature, then a non-reversible change (reduction) in the magnetic flux density occurs. When the permeance coefficient is high, the change in magnetic flux density with temperature change is reversible, however with a low permeance coefficient, the change in the magnetic flux density with temperature change becomes non-reversible. Moreover, the smaller the permanent magnet, the smaller the permeance coefficient. Therefore, the thickness of the permanent magnet 24 is made equal to or more than 3.5 mm, so that the permeance coefficient of the permanent magnet 24 is increased to the extent that the magnetic flux density is reversible. In addition, by restricting the thickness up to 8 mm, a size increase in the sensor 23 can be avoided.

(4) The step portion 20 of the tone wheel 17 is located axially inwards (to the right in FIG. 7) than a brim portion 48 formed on the base end of the nut 6. As a result, it is possible to use a nut 6 with the brim portion 48 having a larger outer diameter, thereby enabling a reduction in surface pressure on the contacting end faces of the nut 6 and the inner ring 4. The step portion 20 can be spaced apart from the brim portion 48. However by contacting this step portion 20 with the brim portion 48, then the tone wheel 17 can be positionally located. It should be noted that embodiment of the above points (1) to (4) is not necessarily limited to the construction of the present invention.

Due to the abovedescribed construction and operation of the speed sensing rolling bearing unit of the present invention, the dimension in the axial direction can be reduced, enabling assembly in vehicles with limited installation space, such as a small automobiles, thus simplifying vehicle design. Moreover, sensor output is increased so that accuracy and reliability in detecting rotational speed of a vehicle wheel and the like, supported by the rolling bearing can be improved. Furthermore, since undue force is not applied to the constituent parts, in spite of being subjected to vibration under operating conditions, then damage to these parts can be prevented, so that reliability and durability are improved.

What is claimed is:

1. A rolling bearing unit with a rotational speed sensor comprising a stationary outer ring member having an open end portion and an outer ring raceway on an inner peripheral face thereof, the open and portion of the outer ring member having inner and outer diameters, a rotatable inner ring assembly having an inner ring raceway on an outer peripheral face thereof, a plurality of rolling elements provided between the outer ring raceway and the inner ring raceway, a cover fixed to the open end portion of the outer ring member, an annular sensor supported generally circumferentially inside the cover and having opposite axial sides, and a rotatable tone wheel made from a magnetic material and supported on the inner ring assembly, the cover comprising a cylindrical portion with axial ends for retaining the sensor therein, having an inner diameter which is larger than the inner diameter of the open end portion of the outer ring member and smaller than the outer diameter of the open end portion of the outer ring member, an end plate bent radially inward from one of the axial ends of the cylindrical portion, a step portion having an outer peripheral rim and bent radially outward from the other axial end of the cylindrical portion, and an engaging portion bent from the outer peripheral rim of the step portion axially away from the cylindrical portion and externally secured to the open end portion of the outer ring member, so that the sensor is clamped on its opposite axial sides between the end plate and the open end portion of the outer ring member with the engaging portion externally secured to the open end portion of the outer ring member.

2. A rolling bearing unit according to claim 1, wherein the sensor is embedded in a synthetic resin molding and molded integral with the cover, such that the synthetic resin molding is clamped on its opposite axial sides between the end plate of the cover and the open end portion of the outer ring member.

3. A rolling bearing unit according to claim 1, wherein the sensor is embedded in a synthetic resin molding having a cylindrical outer surface, such that the cylindrical outer surface is fitted into the cylindrical portion of the cover, and that the synthetic resin molding is clamped on its opposite axial sides between the end plate of the cover and the open end portion of the outer ring member.

4. A rolling bearing unit with a rotational speed sensor comprising a stationary outer ring member having an open end portion and an outer ring raceway on an inner peripheral face thereof, the open end portion of the outer ring member having inner and outer diameters, a rotatable inner ring assembly having an inner ring raceway on an outer peripheral face thereof, a plurality of rolling elements provided between the outer ring raceway and the inner ring raceway, a cover fixed to the open end portion of the outer ring member, an annular sensor supported generally circumferentially inside the cover and having opposite axial sides, and a rotatable tone wheel made from a magnetic material and supported on the inner ring assembly, the cover comprising a cylindrical portion with axial ends for retaining the sensor therein, having an inner diameter which is larger than the inner diameter of the open end portion of the outer ring member and smaller than the outer diameter of the open end portion of the outer ring member, an end plate bent radially inward from one of the axial ends of the cylindrical portion, a step portion having an outer peripheral rim and bent radially outward from the other axial end of the cylindrical portion, and an engaging portion bent from the outer peripheral rim of the step portion axially away from the cylindrical portion and externally secured to the open end portion of the outer ring member, wherein opposite axial sides of the sensor contact the end plate and the open end portion of the outer ring member, respectively.

5. A rolling bearing unit according to claim 4, wherein the sensor is embedded in a synthetic resin molding and molded integral with the cover, and wherein opposite axial sides of the synthetic resin molding contact the end plate of the cover and the open end portion of the outer ring member, respectively.

6. A rolling bearing unit according to claim 4, wherein the sensor is embedded in a synthetic resin molding having a cylindrical outer surface, wherein the cylindrical outer surface is fitted into the cylindrical portion of the cover, and wherein opposite axial sides of the synthetic resin molding contact the end plate of the cover and the open end portion of the outer ring member, respectively.

* * * * *